(12) United States Patent
El Hariri et al.

(10) Patent No.: US 10,362,056 B1
(45) Date of Patent: Jul. 23, 2019

(54) CONTENT-AWARE SPOOFED SENSOR MEASUREMENT DATA DETECTION IN MICROGRIDS

(71) Applicants: Mohamad El Hariri, Miami, FL (US); Eric Harmon, Miami, FL (US); Hany Habib, Miami, FL (US); Tarek Youssef, Miami, FL (US); Osama Mohammed, Miami, FL (US)

(72) Inventors: Mohamad El Hariri, Miami, FL (US); Eric Harmon, Miami, FL (US); Hany Habib, Miami, FL (US); Tarek Youssef, Miami, FL (US); Osama Mohammed, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/246,744

(22) Filed: Jan. 14, 2019

(51) Int. Cl.
*H04L 29/06* (2006.01)
*G06N 3/04* (2006.01)
*G06F 17/18* (2006.01)
*G06Q 10/06* (2012.01)

(52) U.S. Cl.
CPC ......... *H04L 63/1483* (2013.01); *G06F 17/18* (2013.01); *G06N 3/04* (2013.01); *H04L 63/1408* (2013.01); *H04L 63/1433* (2013.01); *G06Q 10/0635* (2013.01)

(58) Field of Classification Search
None
See application file for complete search history.

(56) References Cited

U.S. PATENT DOCUMENTS

| 10,210,470 B2* | 2/2019 | Datta Ray ........... H04L 63/1433 |
| 2003/0172145 A1* | 9/2003 | Nguyen ................ G06Q 10/10 709/223 |
| 2017/0244726 A1* | 8/2017 | Finkel ................. H04L 63/0281 |

* cited by examiner

*Primary Examiner* — Andrew J Steinle
(74) *Attorney, Agent, or Firm* — Saliwanchik, Lloyd & Eisenschenk

(57) ABSTRACT

Systems and methods for detection of spoofed sensor measurements in a microgrid are provided. A system can include a control agent that is configured to determine whether an isolated or continuing intrusion of measurement data received from the primary sensors has occurred, and transmit forecasted measurement data to the controller rather than suspected corrupt measurement data for a suspected isolated intrusion. The control agent and a clone agent can be configured to communicate and work in parallel to confirm a continuing intrusion is occurring, and the control agent can be further configured to transmit measurement data from the redundant sensors to the controller if a continuing intrusion is confirmed.

20 Claims, 8 Drawing Sheets

CONTENT-AWARE SPOOFED SENSOR MEASUREMENT DATA DETECTION IN MICROGRIDS

BACKGROUND

Microgrid operation is becoming heavily reliant on microprocessor-based controllers and communication networks, making it prone to cyber-attacks. The decentralized nature of microgrids, including both energy production (distributed energy resources) and energy consumption (loads) entities, makes information exchange a challenge for proper control operations. To address this issue, a hierarchical control architecture of microgrids has traditionally been used. As seen in FIG. 1, the hierarchical control architecture divides the control operations of a microgrid into three levels depending on the latency and information update time requirements. In the lower level, primary control applications, such as droop and local control, require fast responses in the ranges of milliseconds to microseconds. In the middle level, secondary control applications, such as automatic generation control, require a response time in seconds. The upper layer has a much more relaxed response speed in the minutes to hours range for applications such as energy management and demand response.

To properly implement this control architecture and to manage the exchange of information within and between all three layers in an orderly fashion, a link to industrial standards with interoperable data and protocols is necessary. The IEC 61850 standard has been the most widely industry accepted standard that provides a comprehensive data modelling and organization method that unifies data structure definitions across equipment from different manufacturers. Recently, IEC 61850 has been used for microgrid control applications. The standard is well fit for decentralized and distributed control architectures because it abstracts the definition of the service and data items to be independent from the underlying protocols. The abstracted data items and services can thus be mapped into any other communication protocol. IEC 61850 maps the data to three different protocols based on the application: the Manufacturing Message Specification (MMS) protocol, which is used for control and automation functions, and the Generic Object-Oriented Substation Event (GOOSE) and Sampled Measured Values (SMV) protocols, which are used for real-time operations.

In decentralized industrial control networks, controllers acquire data about the surrounding environment through sensor readings and then issue control commands to actuators accordingly. The IEC 61850 standard stipulations have introduced an intuitive method to make sensor measurements simultaneously available to all controllers in a microgrid network by introducing the concept of the process bus. As shown in FIG. 2, this is done by splitting the input/output of control agents and their control logic and placing a communication bus between them.

Although the process bus has introduced a lot of advantages, such as reduced copper wiring and ensuring availability of measurement data, it brought along cyber threats. According to IEC 61850-9-2, the maximum end-to-end time delay allowed for SMV messages is 4 ms. This tight limitation on message transmission time makes it nearly impossible to encrypt SMV packets especially with the low processing power of publishing MUs and receiving IEDs. In fact, even latest processor technologies fall short in applying message encryption and authentication techniques within the required 4 ms. This fact is further asserted by IEC 62351-6 security standard, which covers the cyber security of SMV messages. The standard relieves time-critical SMV messages from the burden of being encrypted. Therefore, in the event of a network breach, using techniques such as password cracking, backdoors, and malwares, manipulating digital measurement data is an easy task. By similar talking, several methodologies on spoofing measurements of sensor can also be shown on other industrial protocols.

BRIEF SUMMARY

Embodiments of the subject invention provide a bi-layer content-aware fake sensor data detection mechanism for secure control operations in a microgrid. In the first layer, an artificial intelligence module decodes the contents of received network packets and decides on the integrity of measurement data based on comparing with forecasted synthetic data and monitoring the rate of change of the forecasting error derivative. Monte-Carlo simulations were performed to set the decision threshold for this module. The suspected data is then passed into the second layer, where collaboration between control agents and the sensors from which they receive their measurements is instantiated over a secured private mesh network. A final decision is made based on statistical formulations. The practical relevance of the proposed security framework is illustrated experimentally against fake data injection attacks on data collected from a hybrid AC/DC laboratory scale cyber-physical microgrid. The results showed that the artificially intelligent forecaster has an attack detection accuracy of 95.6%. It was also shown that the proposed second layer can detect all the false positives of layer 1 and correct its decisions.

Layer 2 is also capable of detecting the normal accumulation in the forecasting error, which grows naturally over time. Finally, experimental demonstrations showed that the detection latency of the proposed system is near real-time, in the range of 1-2 ms.

DETAILED DESCRIPTION

The following disclosure and exemplary embodiments are presented to enable one of ordinary skill in the art to make and use a system for spoofed sensor measurements in a microgrid according to the subject invention. Various modifications to the embodiments will be readily apparent to those skilled in the art and the generic principles herein may be applied to other embodiments. Thus, the devices and methods related to the system for intrusion detection in a microgrid are not intended to be limited to the embodiments shown, but are to be accorded the widest scope consistent with the principles and features described herein.

To enhance the reliability and harden the operational security of microgrid control architecture against spoofing measurement data of sensors, a bi-layer content aware intrusion detection and prevention system is presented herein. As described herein, it assumed that control agents are associated with doppelganger (or clone) agents. The controller receives sensory feedback from the doppelganger agent via the process bus. The doppelganger agents could be merging units or remote terminal units installed at different measurement points in the microgrid.

Figure 1:
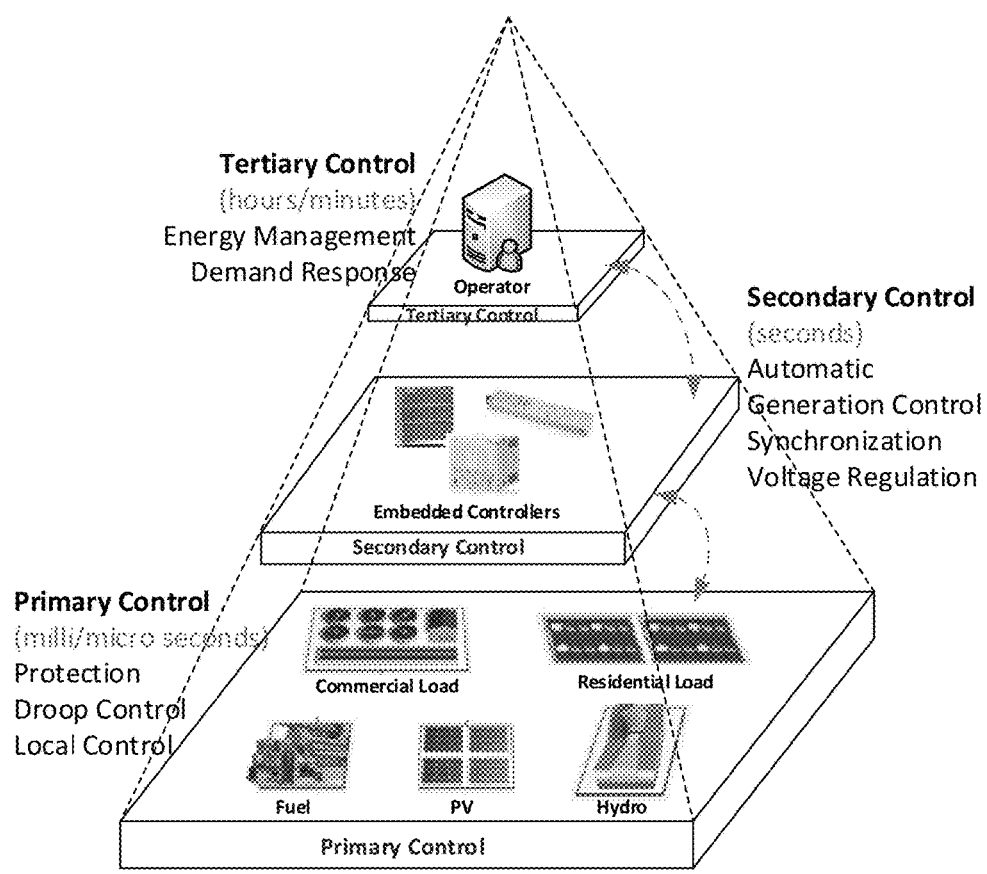
FIG. 1 is a diagram of a hierarchical microgrid controlled power system (dashed curves represent information exchange).
Figure 2:
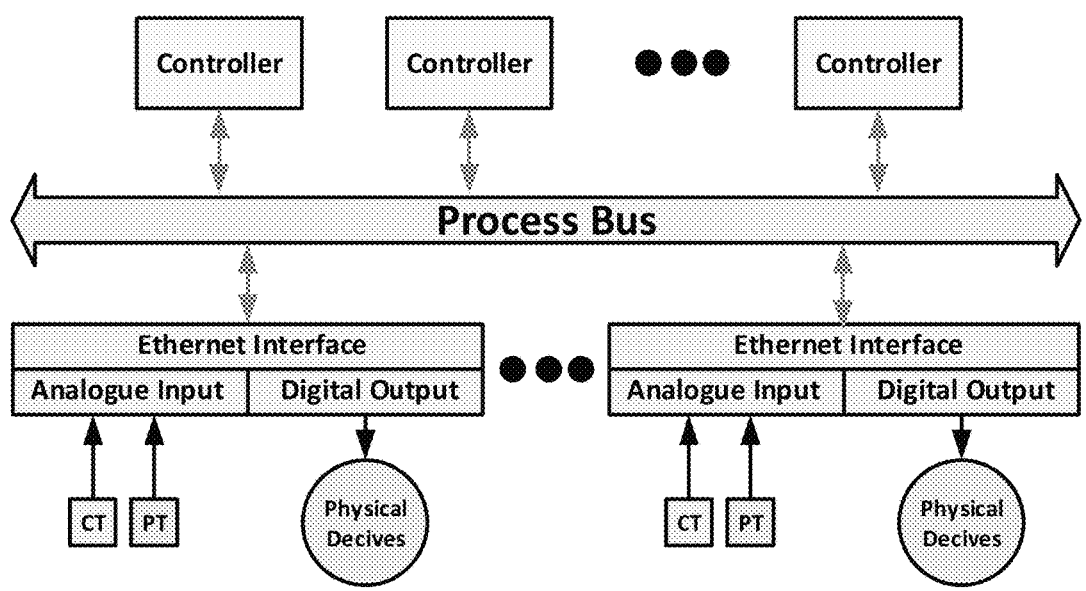
FIG. 2 is a diagram of an IEC 61850 process bus.
Figure 3:
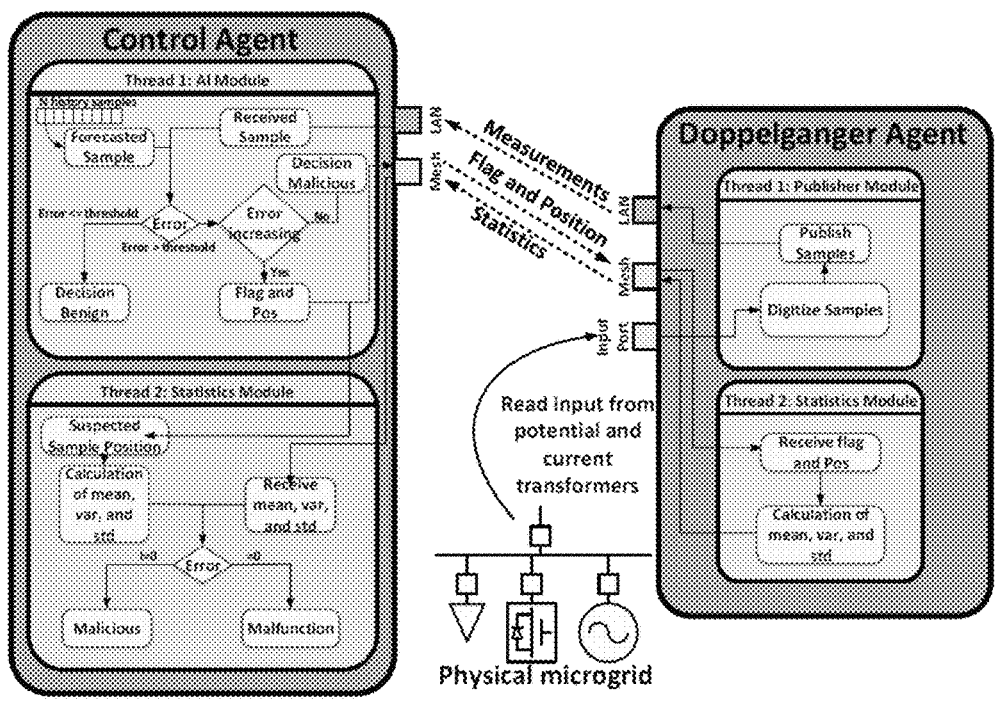
FIG. 3 is a diagram of a content-aware intrusion detection and prevention framework.

In an embodiment of the subject invention, each of the control agents and the doppelganger agents has two threads running in parallel. Thread 1 of the doppelganger agent receives analogue measurements (via current or potential transformers), digitizes them through its analogue to digital converter, and publishes them over the microgrid local area network (LAN). On the other hand, the control agent subscribes to these measurements and passes them through its first thread, the AI module. Based on N previous samples, the AI module forecasts the value of the received measurement and compares the error between the received and the forecasted values. If the error is less than a specified threshold, the received sample is marked as benign and is passed to the control logic. However, if the error is greater than the specified threshold, the AI module will suspect an intrusion. This suspicion might be true or might be a false positive. Therefore, to correctly interpret its decision, the AI module will hold onto this sample and will receive M new consecutive samples (for example 5 new samples). For every one of the new samples, the error between the forecasted sample and the received one will be recorded. Then the error derivative will be calculated. If the derivative indicates that the error is not increasing or if it was a single spike, then this means that the suspected sample was fake. Therefore, it will be discarded and the synthetic sample will be passed to the controller instead. Now, if the derivative indicates that the error is increasing, a flag is issued and the second layer of the proposed defense scheme is activated to further investigate the issue. At this stage, thread 2 of the control agent is activated. Thread 2 will create a dataset containing the suspected sample, M previous samples, and the M new samples which were monitored. Thread 2 will then calculate the mean, the variance and the standard deviation of this dataset. This dataset is all from the measurement received over the network. Simultaneously, the control agent sends the flag and the position of the suspected sample to thread 2 of the doppelganger agent over a secured private mesh network. Since each measured sample is associated with a sample count counter, the doppelganger agent will create a similar dataset composed of the suspected sample, five previous, and five later samples. However, this dataset will be from the local digitized data that hasn't been altered. Similarly, thread 2 of the doppelganger agent will calculate the mean, the variance, and the standard deviation of the created dataset and will send them to the control agent over the private mesh network. Finally, the control agent will compare both sets of statistical indicators. If the statistical indicators from both agents do not match, it is construed that an attack has occurred which resulted in the accumulation of the AI forecasting error. Here, controllers will retrieve measurement data from redundant sensors until the attack has been cleared. If the statistical indicators match, thus the received measurements are benign and will be used to readjust the accumulation in the forecasting error of the AI module, which in this case is due to a malfunction. By this process, the false positives of the AI module are detected and compensated for, and the accumulation of forecasting error, which happens in most forecasters regularly over time, is self-detected. This process is shown in FIG. 3.

In order to create the connection needed for the exchange of the flag and the statistical data, an isolated out-of-band network is implemented.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1—AI Module

The AI module is a forecaster that is trained to anticipate the value of the incoming measurements in real-time. To do that, a feedforward neural network has been developed as the main processing engine of the AI module. The neural network has three layers: one input, one hidden, and one output layer. The input layer had 20 neurons corresponding to 20 previous samples, whereas the output layer had 1 neuron corresponding to the forecasted sample. The number of neurons in the hidden layer was 10. The forecasting accuracy of the neural network against the computation time was studied. Based on this empirical study, it was found that 20 previous samples and 10 neurons in the hidden layer produce the highest accuracy in the least amount of time. The study was performed on an ARM® Cortex®-A53 1.5 Ghz processor, on which the agents were implemented.

Figure 4:
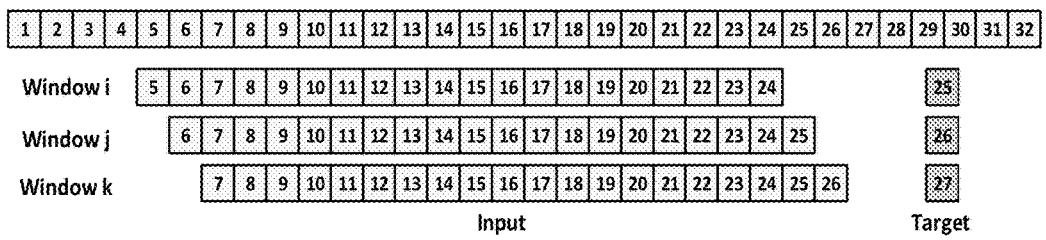
FIG. 4 shows an example of sliding window training/target data generation.

To properly forecast time-varying current data, the neural network was trained with the back propagation algorithm with a sliding window approach. Starting from the first sample, 20 samples were counted as input and the 21st sample was set as the target output. Next, the window moved over one sample where the input became samples 2 to 21, inclusive, and the target output was sample 22, and this process continued. The general process is depicted in FIG. 4. An exploration simulation approach was adopted to generate a rich set of target and training data. That is, measurement data corresponding to different events of the hardware microgrid were collected from history logs. These events included different fault events that had previously happened and other contingencies such as loss of transmission lines or generation units. An accurate model of the microgrid was then developed on Matlab/Simulink to generate data for the remaining contingency cases.

Figure 5:
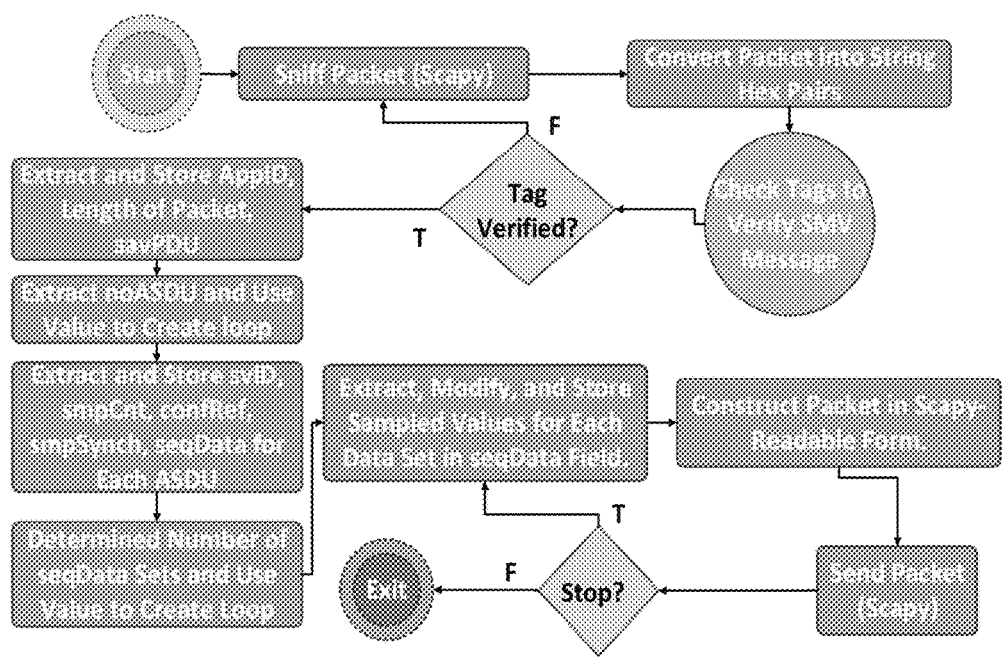
FIG. 5 is a block diagram illustrating a malware development process.

To set the decision threshold of the AI module, Monte-Carlo simulations were performed for more than 2,500 test cases, each with 2001 measurement samples. For each of the test cases, random fake data was injected at different instances according to equation (1). The fake data ranged between −4 and 4 Amps, which is 1.5 times the rated current of the studied microgrid.

$$\text{fake data} = (b-a) \times \text{rand}(\ ) + a \quad (1)$$

Where a=−4, b=4, and rand ( ) is pseudo-random number generator that produces a random number between 0 and 1. The forecasting error of the neural network was then recorded and it was found that a 2% decision threshold produces the lowest false positive rate. The block diagram of the malware script used to spoof the sensor measurements is shown in FIG. 5.

Example 2—Statistical Module

The purpose of the statistical module is to create a small yet indicative feature vector of the two datasets generated by the control and the doppelganger agents to decide if the decision of the AI module was a true positive or a false positive. As mentioned earlier, the selected statistical features for the two datasets are the mean, variance, and standard deviation, which are calculated according to equations (2), (3), and (4), respectively.

$$\mu = \sum_{i=1}^{N} \frac{x_i}{N} \quad (2)$$

$$\text{var} = \frac{1}{N} \sum_{i=1}^{N} (x_i - \mu)^2 \quad (3)$$

$$\sigma = \sqrt{\frac{1}{N} \sum_{i=1}^{N} (x_i - \mu)^2} \quad (4)$$

Figure 6:
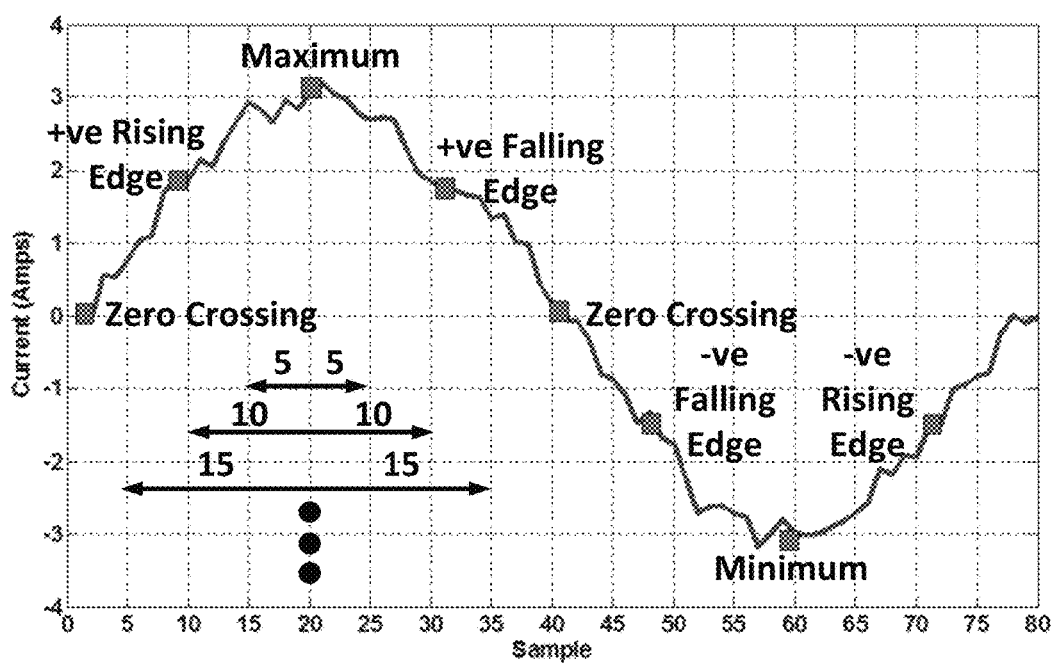
FIG. 6 is a plot of a performed fake data injection attack study.
Figure 7:
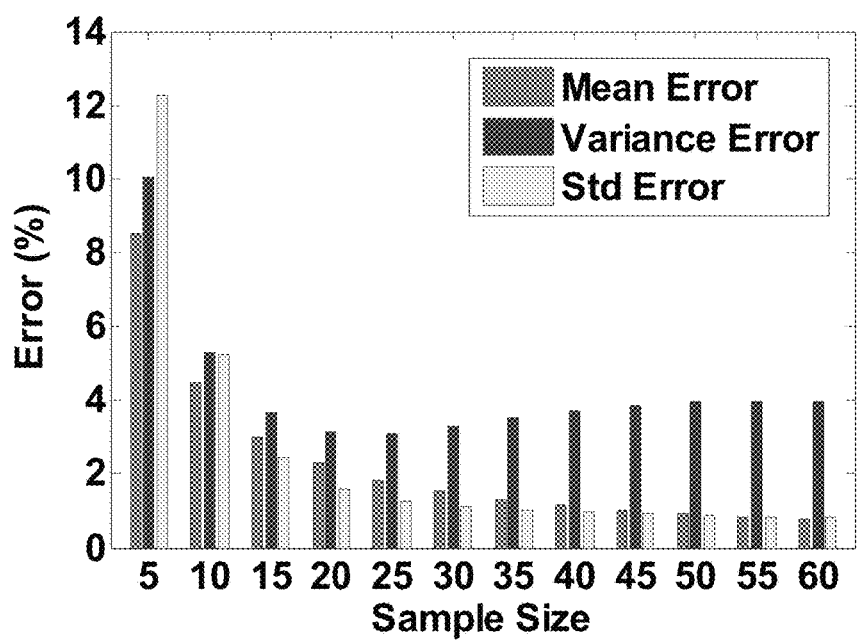
FIG. 7 is a bar graph showing the percentage error of the feature vector with increasing sample size.

In order to select a suitable value for N, the following study was performed. Consider the current data shown in FIG. 6. Various fake data was injected at the peak of the sine wave ranging between +/−0.5 to +/−1.5 times of that sample. Next 5 samples were taken before and after the peak sample and the mean, variance, and standard deviation were calculated. The same were also calculated to the same sample from the original data (i.e. with the actual value instead of the fake sample). The error of both statistical vector indicators was then calculated for all the fake data cases. Next, the dataset size was increased to 10 before and 10 after the fake sample and the error was calculated. The same procedure was then repeated reaching a dataset size of 60 samples before and 60 samples after the fake sample. The same procedure was repeated at all the critical locations in the sinusoid: the minimum, negative/positive rising/falling edge, and zero crossing. All the error data were then averaged for each data set size and are plotted in FIG. 7. As shown in FIG. 7 the most indicative dataset (largest errors) was for 5 samples before the suspected sample and 5 samples after it. Therefore, in this work, N=11. This corresponds to 5 samples before the suspected sample, 5 samples after it, and the suspected sample itself.

Example 3

In order to verify the effectiveness of the proposed intrusion prevention framework, several experiments were performed on the different modules in this framework against fake data injection attacks and the results are reported in this section.

Figure 8:
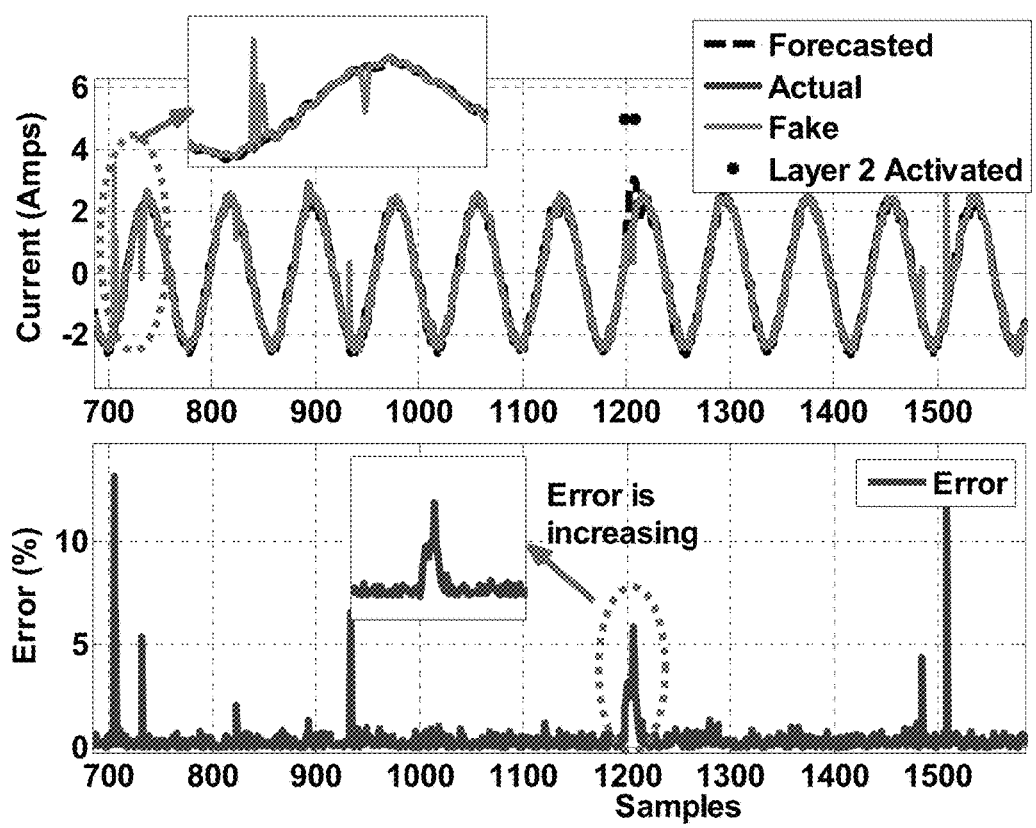
FIG. 8 shows plots of performance results of an intrusion prevention framework according to an embodiment of the subject invention.

Fake measurement data that are more than +/−1.5 times the rated current at Load 1 bus were injected. As seen in the zoomed part of the top part of FIG. 8, such high fake data resulted in an error between the forecasted data and the received sample greater than 2%. Therefore, for such a case, the AI module will monitor the error derivative of 5 more samples. Also, as seen in FIG. 8, it was found that for the two high fake data injections, there was a single spike in the error derivative (between samples 700 and 750). This means that the indeed the decision of the AI module is that the data received at these two samples are corrupted. It will therefore pass the synthetic data to the controller.

A small perturbation to the current value at sample 1200 was injected. However, as explained earlier, the NN was trained to recognize the current values for normal and fault conditions. Therefore, in this small perturbation attack, the NN forecasting error started to accumulate indicating a fake beginning of a fault situation. At this stage, the AI module monitored the rate of change of the error of the next few samples. As seen in FIG. 8, the error derivative was increasing indicating that indeed an accumulation of the forecasting error between the received and forecasted samples was occurring. Therefore, the AI module sent a flag to the statistics module as well as the doppelganger agent along with the position (sample 1200) of the suspected sample to activate layer 2 of the proposed framework. Both the control agent and its doppelganger performed the statistical study explained earlier. The results of the statistical analyses showed a difference in the calculated mean, variance, and standard deviation. This means that the forecasting error accumulated due the perturbation attack and a beginning of a fake fault situation occurred.

Several perturbation attacks were performed at different instants throughout the experiment. The study was performed on 500 data sets similar to those in FIG. 8. The results showed that the false positive rate of the NN is 4.4%. This means that the accuracy of the NN is 95.6%. However, it is important to mention that if these current measurements were to be used in critical applications, such as protection, any one of the incorrectly forecasted paths would trigger a false positive and could cause service interruption. Since the controller will react by sending GOOSE trip commands to circuit breakers. Therefore, in the herein described framework the second layer was utilized to detect these false positives and take corrective actions accordingly. In the performed experiments, Layer 2 was able to detect all the false positive cases.

Figure 9:
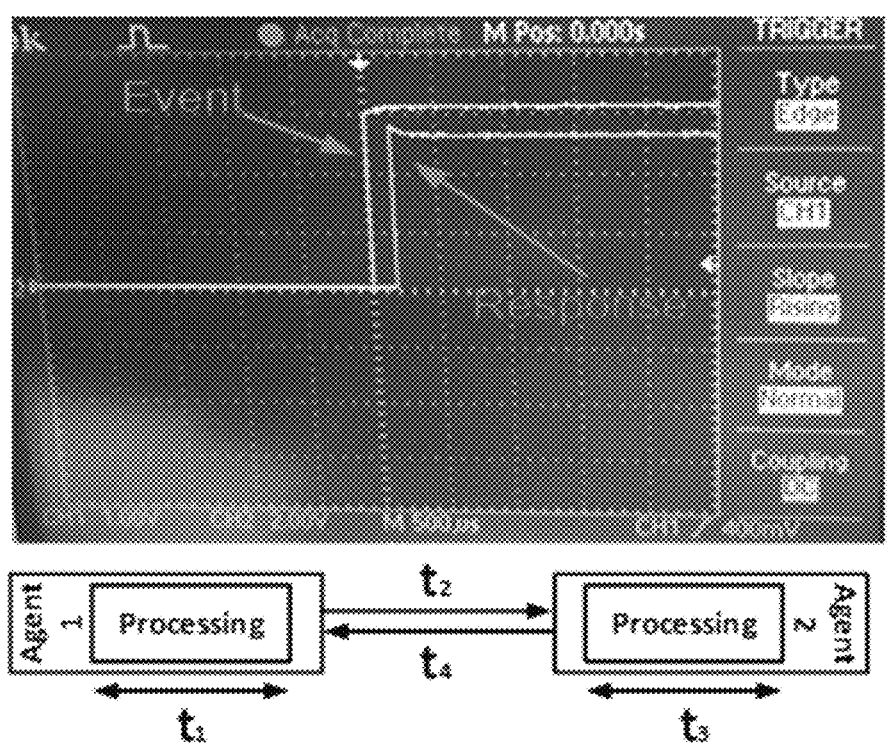
FIG. 9 is a diagram illustrating detection latency.

Finally, the latency of the complete detection process including the information exchange over the mesh network and the hardware time required for packet crafting was assessed. In FIG. 9, $t_1$ is the time starting from the instant of issuing the flag, the time to calculate the statistical vector in the control agent, and finally the decision making. $t_2$ is the time it takes the first packet, which contains the flag, to reach the doppelganger agent. $t_3$ is the time for calculating the statistics vector by the doppelganger agent. Finally, $t_4$ is the time for the packet, which contains the statistics, to reach the control agent. Therefore, the total detection latency is calculated in equation (5):

$$t_{total} = t_1 + t_2 + t_3 + t_4 \quad (5)$$
$$t_{total} = 0.4 + 0.25 + 0.25 + 0.3$$
$$t_{total} = 1.2 \text{ ms}$$

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A computer-based system for detection of spoofed sensor measurements in a microgrid, the system comprising:
    a microgrid comprising a physical control agent, a physical clone agent, a controller, and a plurality of primary and redundant sensors that sense measurement data from the microgrid,
    the control agent being configured to determine whether an isolated or continuing intrusion of measurement data received from the primary sensors has occurred, and transmit forecasted measurement data to the controller rather than suspected corrupt measurement data for a suspected isolated intrusion,
    the control agent and the clone agent being configured to communicate and work in parallel to confirm whether a continuing intrusion is occurring,
    the working in parallel by the control agent and the clone agent to confirm whether a continuing intrusion is occurring comprising:
        the control agent calculating an error derivative; and
        if the error derivative indicates that an error is increasing, the control agent calculating first statistical data on a first dataset comprising a suspected sample, sending flag and position data of the suspected sample to the clone agent, which then calculates second statistical data of a second dataset comprising the suspected sample received from the control agent and sends the second statistical data to the control agent, which then compares the second statistical data received from the clone agent with the first statistical data calculated by the control agent to determine whether a continuing intrusion is occurring,
    the control agent being further configured to transmit measurement data from the redundant sensors to the controller if a continuing intrusion is confirmed to be occurring.

2. The system according to claim 1, the control agent comprising an artificial intelligence module and a statistics module,
    the artificial intelligence module comprising a neural network of an input layer and a hidden layer respectively comprised of a plurality of interconnected nodes and an output layer comprised of a single node connected to the hidden layer,
    the artificial intelligence module configured to learn characteristics of the microgrid, forecast measurement data in real time, and determine if an intrusion has occurred, and
    the statistics module configured to determine if the artificial intelligence module's determination of intrusion is a true positive or a false positive.

3. The system according to claim 1, the clone agent comprising a publisher module and a clone statistics module comprising the second thread of the clone agent,
    the publisher module configured to publish measurement data to the microgrid network, and
    the clone statistics module configured to determine if the artificial intelligence module's determination of intrusion is a true positive or a false positive.

4. The system according to claim 1, the control agent and the clone agent being configured to exchange flag, position, and statistical data via a private mesh network.

5. The system according to claim 1, the plurality of primary and redundant sensors each comprising respective current transformers and potential transformers.

6. The system according to claim 1, the control agent being configured to determine whether an isolated or continuing intrusion has occurred based upon on an error value between the forecasted measurement data and the received measurement data.

7. The system according to claim 2, the artificial intelligence module being further configured to determine the suspected isolated intrusion based upon a finding of error values between the suspected corrupt data and consecutive sample measurement data.

8. The system according to claim 2, the artificial intelligence module being further configured to determine the suspected continuing intrusion based upon a finding of rising respective error values between the suspected corrupt data and consecutive sample measurement data.

9. The system according to claim 7, the statistics module determining if the artificial intelligence module's determination of continuing intrusion is a true positive or a false positive by statistical comparisons, of the suspected corrupt data and additional sampled measurement data, from the statistics module and the clone's statistics module.

10. The system according to claim 9, the clone statistics module's additional sample measurement data originating from local digitized data.

11. The system according to claim 2, the artificial intelligence module comprising the input layer of 20 nodes, the hidden layer of 20 nodes, and the output layer of 1 node.

12. The system according to claim 9, the statistical comparisons being based upon a mean, variance, and standard deviation.

13. A computer-based method for intrusion detection in a microgrid, the method comprising:
  determining, by a physical control agent, whether an isolated or continuing intrusion of measurement data received from primary sensors of a microgrid has occurred;
  transmitting, by the control agent, forecasted measurement data to the controller rather than suspected corrupt measurement data for a suspected isolated intrusion;
  confirming, by the control agent and a physical clone agent in parallel, whether a continuing intrusion has occurred; and
  transmitting, by the control agent, measurement data from redundant sensors of the microgrid to a controller of the microgrid if a continuing intrusion is confirmed,
  the confirming in parallel by the control agent and the clone agent whether a continuing intrusion has occurred comprising:
    the control agent calculating an error derivative; and
    if the error derivative indicates that an error is increasing, the control agent calculating first statistical data on a first dataset comprising a suspected sample, sending flag and position data of the suspected sample to the clone agent, which then calculates second statistical data of a second dataset comprising the suspected sample received from the control agent and sends the second statistical data to the control agent, which then compares the second statistical data received from the clone agent with the first statistical data calculated by the control agent to determine whether a continuing intrusion is occurring.

14. The method according to claim 13, further comprising communicating by the control agent with the clone agent, via a private mesh network.

15. The method according to claim 13, the determining of whether an isolated or continuing intrusion has occurred being based upon on an error value between the forecasted measurement data and the received measurement data.

16. The method according to claim 13, further comprising determining the suspected isolated intrusion based upon a finding of constant respective error values between the suspected corrupt data and consecutive sample measurement data.

17. The method according to claim 16, further comprising determining the suspected continuing intrusion based upon a finding of rising respective error values between the suspected corrupt data and consecutive sample measurement data.

18. The method according to claim 13, further comprising determining the suspected continuing intrusion based upon a finding of rising respective error values between the suspected corrupt data and consecutive sample measurement data.

19. The method according to claim 13, further comprising determining whether the determination of continuing intrusion is a true positive or a false positive by statistical comparisons, of the suspected corrupt data and additional sample measurement data, from the control agent and the clone agent.

20. A computer-based system for intrusion detection in a microgrid, the system comprising:
  a microgrid comprising a physical control agent, a physical clone agent, a controller, and plurality of primary and redundant sensors that sense measurement data from the microgrid,
  the control agent and the clone agent communicating via a private mesh network,
  the control agent being configured to determine whether an isolated or continuing intrusion of measurement data received from the primary sensors has occurred, and transmit forecasted measurement data to the controller rather than suspected corrupt measurement data for a suspected isolated intrusion,
  the control agent and the clone agent being configured to communicate and work in parallel to confirm a continuing intrusion is occurring,
  the control agent being further configured to transmit measurement data from the redundant sensors to the controller if a continuing intrusion is confirmed,
  the plurality of primary and redundant sensors each comprising respective current transformers and potential transformers,
  the working in parallel by the control agent and the clone agent to confirm whether a continuing intrusion is occurring comprising:
    the control agent calculating an error derivative; and
    if the error derivative indicates that an error is increasing, the control agent calculating first statistical data on a first dataset comprising a suspected sample, sending flag and position data of the suspected sample to the clone agent, which then calculates second statistical data of a second dataset comprising the suspected sample received from the control agent and sends the second statistical data to the control agent, which then compares the second statistical data received from the clone agent with the first statistical data calculated by the control agent to determine whether a continuing intrusion is occurring.

* * * * *